United States Patent [19]
Nash

[11] 4,358,150
[45] Nov. 9, 1982

[54] TAILGATE HANDLE AND LATCHING MECHANISM

[75] Inventor: Culver R. Nash, Royal Oak, Mich.

[73] Assignee: Chrysler Corporation, Highland Park, Mich.

[21] Appl. No.: 247,494

[22] Filed: Mar. 25, 1981

[51] Int. Cl.³ .............................................. B62D 25/00
[52] U.S. Cl. ....................................... 296/50; 296/56;
296/57 R; 49/48
[58] Field of Search ................. 296/57 R, 50, 51, 106,
296/56; 292/47, 48; 49/394

[56] References Cited

U.S. PATENT DOCUMENTS

| | | | |
|---|---|---|---|
| 2,911,247 | 11/1959 | Corbin | 292/48 |
| 3,336,070 | 8/1967 | Jackson | 296/57 R |
| 3,454,299 | 7/1969 | Hewitt | 296/57 R |
| 3,612,601 | 10/1971 | Himka | 296/51 |
| 4,157,844 | 6/1979 | Sarosy | 292/48 |

Primary Examiner—Robert R. Song
Attorney, Agent, or Firm—Newtson & Dundas

[57] ABSTRACT

A vehicle tailgate handle latch mechanism including a pair of latch assemblies carried by casings adapted to be fixed adjacent each side of the tailgate for engagement with an associated striker member on the vehicle body. A pair of control rods are journaled on the tailgate for rotational movement about their own axis disposed parallel with the axis of the gate hinges. A central lift handle rotates the control rods about their axis such that their outboard hooked ends release pawl elements of their associated latch assemblies causing spring biased ratchet members to automatically rotate to then open position unlatching their strikers allowing the tailgate to be moved to its open position.

6 Claims, 8 Drawing Figures

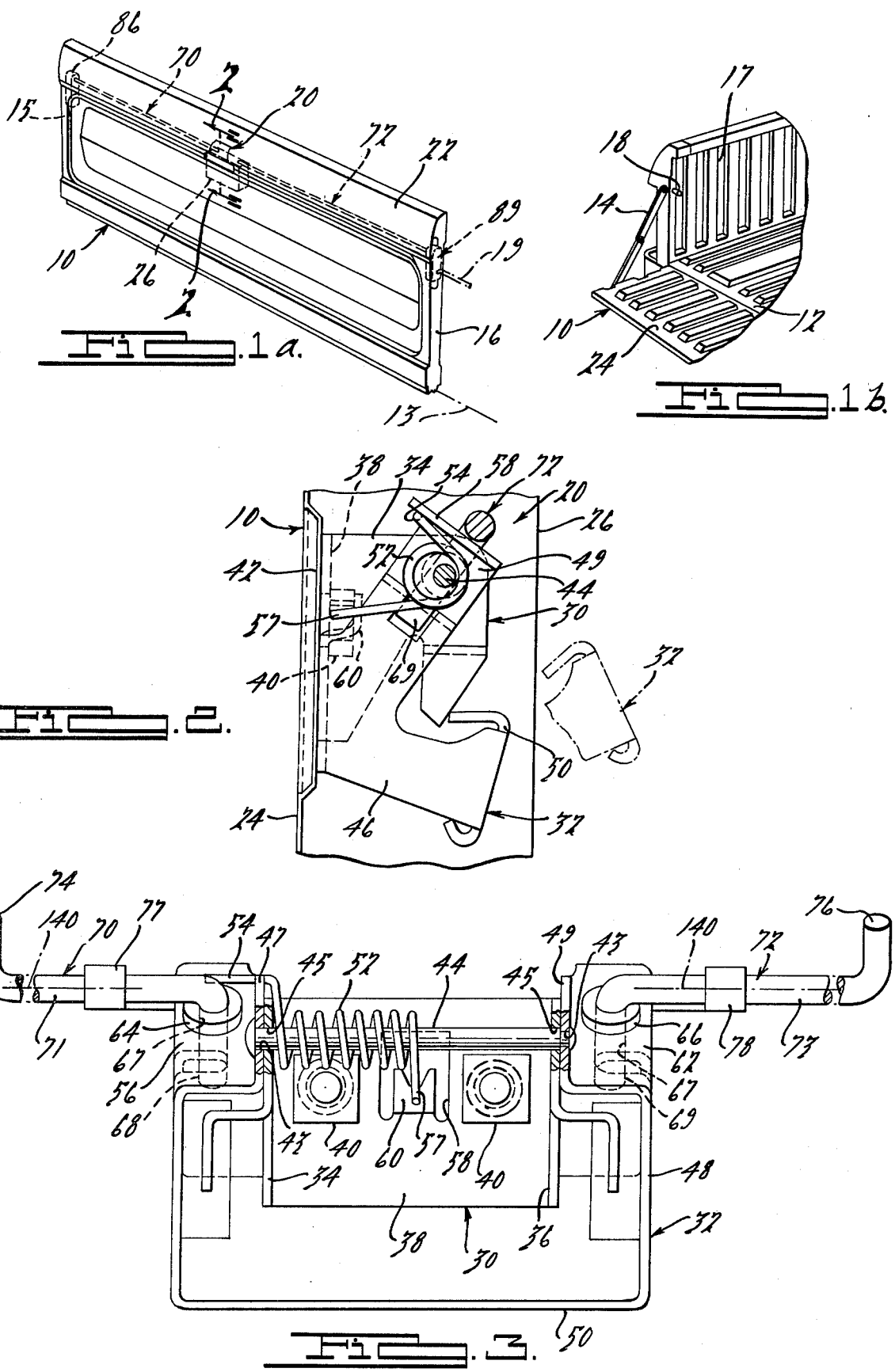

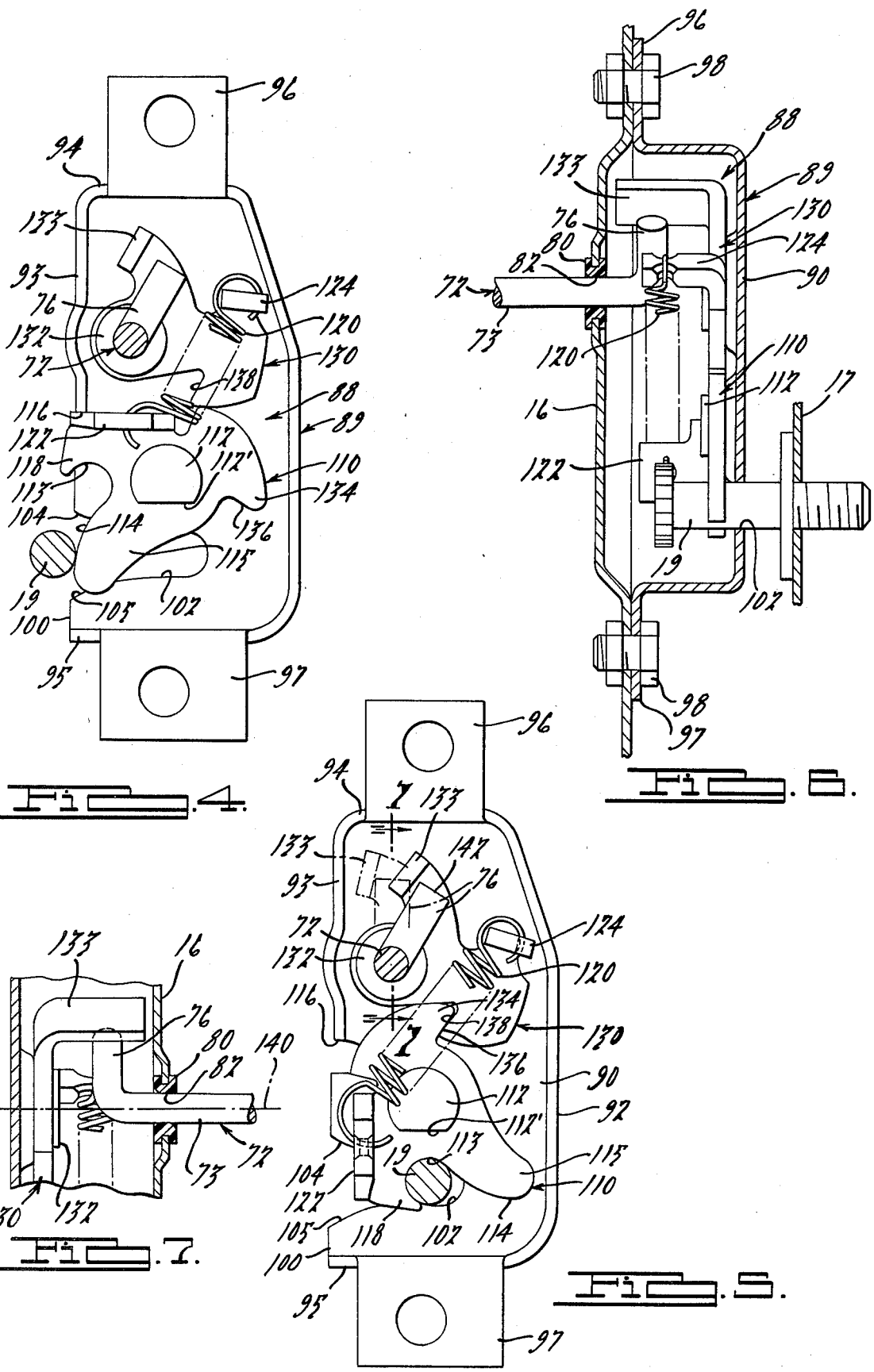

TAILGATE HANDLE AND LATCHING MECHANISM

BACKGROUND OF THE INVENTION

This invention relates to latching arrangements for vehicle enclosures and more particularly to a vehicle tailgate latch and handle mechanism.

The prior known tailgate latching mechanisms, as shown for example in U.S. Pat. Nos. 2,911,247 to Corbin issued Nov. 3, 1969, 3,336,070 to Jackson issued Jan. 7, 1965, 3,612,601 to Himka et al issued Oct. 12, 1971, and 4,157,844 to Sarosy et al issued June 12, 1979, require an extensive number of component parts thus increasing their weight and cost. Among the parts are T-shaped levers, bellcrank levers etc. operated by handles to longitudinally move control rods via pivotal connection with the tailgate latches. It has become an ever increasing concern to simplify vehicle door latch mechanisms to minimize the number of moving parts thereby reducing weight, cost and assembly time.

SUMMARY OF THE INVENTION

One feature of the tailgate handle and latch mechanism of the present invention provides a new and improved sturdy construction wherein pivotal control rods are operated by a lift handle to automatically release latching assemblies. The tailgate supports double L shaped connecting rods for rotational movement about their axis upon upward pivoting of the gate actuating handle. The pivotal axis of the operating handle and the actuator rods are arranged in combination with the pivotal axis of the latch pawl and ratchet elements providing a substantial mechanical advantage for ease of operation of the tailgate latching assembly. Other features and advantages of the invention, such as improved service life, will be evident from the following detailed description of the preferred embodiment of the invention and the accompanying drawings therein.

FIG. 1A, is a perspective view of a tailgate showing portions of the handle and the latching mechanism of the present invention;

FIG. 1B, is a fragementary perspective view of a portion of a cargo area of a pick-up truck showing the tailgate in its dropped position relative to the rear opening of the truck bed;

FIG. 2 is an enlarged fragmentary view partly in section, of the tailgate operating handle taken substantially on the line 2—2 of FIG. 1A;

FIG. 3 is an enlarged elevational detail view of the operating handle with parts broken away;

FIG. 4 is an enlarged detail view, partly in section, of the latch assembly and casing adapted to be mounted on the right hand and face of the tailgate, the latch being in its gate release position with the striker being shown about to contact the ratchet;

FIG. 5 is a view similar to FIG. 4 of the right-hand latch assembly with the ratchet and pawl shown in their gate retaining position;

FIG. 6 is a vertical plane view of the right-hand latch mechanism shown fitted to the right-hand edge of the tailgage in FIG. 1A with portions of the casing, gate and body, being shown in section, and the latch being in the latched position shown in FIG. 5; and FIG. 7 is an enlarged fragmentary elevational view, partly in section, of a portion of the right-hand latch mechanism fitting to the right-hand edge of the tailgage in its gate retaining position.

DESCRIPTION OF THE PREFERRED EMBODIMENT

Referring to FIG. 1A of the drawings, an embodiment of the present invention is illustrated by way of example, is designed for use on a pickup truck with a vertically swinging tailgate 10 closing a back cargo opening shown at 12 in FIG. 1B. The tailgate is swingable about a longitudinal hinge axis 13 to a horizontal position for retention by pairs of articulated arms 14 attached to end plates 15 and 16 of the tailgate and the sheet metal sides 17 of the cargo area. Strikers 18 and 19 extend in opposed manner from each side of the cargo opening 12.

The handle and latch mechanism includes a release handle arrangement, generally indicated at 20, supported within a recessed area of the upper portion of the tailgate between an outer panel 22 and inner panel 24 (FIG. 3). A rectangular aperture 26 in panel 22 defines the recessed area in which the lift handle arrangement is housed.

Referring now to FIGS. 2 and 3, tailgate release handle arrangement 20, includes a mounting bracket 30 and a combined handle and lever 32. The bracket 30 is of U-form and includes left 34 and right 36 flange portions, and a bridge portion 38 connecting the flange portions 34,36. Bracket 30 is fixed to the inner panel 24 of the tailgate by suitable means such as square headed bolts 40 passing through the bridge portion 38 and into depressed gusset 42 of the inner panel 24. A pivot pin 44 is journaled in aligned holes 45 of the flange portions 34,36 for rotation about a horizontal axis parallel with the tailgate axis 13.

The handle lever 32 includes a left-hand outer vertical arm portion 46 having an inner inwardly offset ear portion 47 journaled in aligned holes 43 on pin 44 adjacent bracket flange portion 34. The lever handle further includes a right-hand vertical arm portion 48 having an inwardly offset ear portion 49 journaled on pin 44 adjacent the right-hand bracket flange portion 36, and a horizontal finger gripping bight portion 50 connecting the arms 46,48. A handle lever spring 52 is coiled around pivot pin 44. One end 54 of the spring 52 engages the underside of handle return flange 56 and the other end 57 is fixed to the bridge 38 of bracket 30 by means of opening 58 of a lancedout tab portion 60 so that pivoting of the lever handle 32 about the axis of pin 44 winds and unwinds spring 52.

As seen in FIG. 3 the handle lever 32 also includes inwardly directed right-hand return flange portion 62 connecting the pivot ear 49 with its outer arm portion 48. Thus, each of the return flanges 56 and 62 are in mirror image relation to each other and each include aperture means therein for receiving plastic grommets 64 and 66, respectively. The grommets 64,66 define bores 67 for receiving L-shaped or hooked-end portions 68,69 each located at the inboard end of a pair of actuator or control rods generally indicated at 70 and 72 respectively.

Each of the actuator rods 70 and 72 are suitably mounted between the tailgate outer and inner panels 22,24 for rotational movement about their principal longitudinal axes paralleling the gate pivotal axis 13. In the preferred form each of the actuator rods are formed in a mirror image double L-shaped manner. The rods 70,72 have their ends bent substantially at right angles to the rod principal axis defining the inner laterally extending hooked-end portions 68 and 69 and outer laterally extending hooked-end portions 74 and 76 respectively (FIG. 3).

As seen in FIG. 3 each actuator rod 70,72 has a journal portion 71 and 73 respectively which are rotatively supported adjacent their inner hooked ends by suitable journal means such as carburetor-type clips indicated at 77 and 78, respectively. FIGS. 6 and 7 show the actuator rod 72 supported in its associated tailgate end walls 16 by means of plastic grommet 80 defining circular aperture 82 for the reception of the distal hooked end of its associated actuator rod 72.

FIG. 1a shows a shallow box-like left-hand one piece casing 86 for supporting a left-hand latch assembly (not shown). FIGS. 4–7 show a right-hand latch assembly 88 mounted within a one-piece right-hand casing 89. Each of the latch assemblies and casings are symmetrical opposites and thus mirror images of each other. Therefore, only the right-hand casing and latch assembly is shown and described.

Each casing 86,89 has a latch base 90, peripheral rear and forward side walls 92,93 and upper and lower end walls 94,95. The end walls 94,95 are formed with a right-angled upper and lower mounting brackets 96 and 97 respectively. Each casing 86,89 is fixed to its associated tailgate end plate 15,16 respectively by means of bolts 98 (FIG. 6).

The lower forward edge 100 of the latch base 90 is provided with a central striker receiving slot 102 which opens forwardly by means of diverging edges 104 and 105 effective to engage and cam the associated striker 18,19 into the slot 102 upon upward pivoting of the tailgate.

A rotor or ratchet 110 is pivotally mounted on the base 90 by means of a rivet or pin 112 located above the slot 102. The rivet head has a portion removed at edge 112' to provide clearance of the head of the striker 19. The ratchet 110 has a jaw or notch 113 and a striker engaging cam edge 114 of ratchet throwout arm 115, which overlies slot 19 so as to be engaged by the striker upon closing the tailgate. By swinging ratchet 110 counterclockwise in FIG. 4 ratchet latch arm 118 is moved around the striker to the latching position of FIG. 5 such that the striker 19 is confined between the ratchet notch 113 and the casing slot 102.

The ratchet 110 is resiliently urged clockwise to the unlatched position of FIG. 4 to the limit permitted by stop 116 provided at sidewall 93 lower edge, by means of a coil tension spring 120. The latter is connected under tension with a tab 122 of ratchet element 110 and a tab 124 of a pawl element 130 pivoted on base 90 by pivot pin or rivet 132. In its unlatched positions of FIG. 4 the pawl 130 is located at substantially the same position as in its latched position of FIG. 5 except for a slight clockwise movement wherein the trigger tab 133 is rotated a few degrees so as to be juxtaposed to the rod hooked-end 76. The ratchet 110 when in its FIG. 5 latched position, has its tab 122 oriented substantially vertical whereas the tab 122 is oriented substantially horizontal and engages stop 116 in its unlatched position. As illustrated in FIG. 5 the axis of pivots 112 and 132 are located on the same side of a vertical line through the striker 19, the pivot axis of pin 132 being located somewhat to the left of the pivot axis of pin 112, so that the spring 120 yieldingly urges both ratchet element 110 and pawl element 130 clockwise.

Referring to FIG. 4 rotor or ratchet element 110 presents at least one tooth 134 having a substantially radial face 136 for coaction with shoulder 138 formed on pawl 130. Upon rotation of the ratchet element 110 in response to closing of the tailgate 10, and engagement of the striker 19 by cam edge 114 the pawl element shoulder 138 is urged into engagement with the ratchet tooth radial face 136 by the spring 120. When the pawl shoulder 138 engages the ratchet radial face 136 the latching ratchet element 110 is held in its fully latched position (FIG. 5). As viewed in FIG. 5 counterclockwise turning of the pawl about the shaft or pin 132 releases the pawl shoulder 138 from the ratchet tooth radial face 136 and enables the ratchet to turn clockwise from the latched position of FIG. 5 to the unlatched position shown in FIG. 4 to release the striker 19 and permit opening of the tailgate. The spring 120 continuously urges the ratchet element toward the unlatched position of FIG. 4 so that the ratchet element automatically turns to such position upon release of the pawl element.

To release the pawl shoulder 138 from the ratchet element 110 to unlatch the tailgate, the handle and lever 32 is pivoted upward about pin 44 from its retracted solid line position to its dashed line position in FIG. 2. This rotates the connector rods 70 and 72 and causes the outboard hooked end portions 74 and 76 to swing into contact with their associated pawl tabs 133 to trip the pawl elements 130 and release the ratchet elements 110, thereby untrapping strikers 118 and 119 from their associated casing slots 102 and rotor notches 113.

It will be noted in FIG. 7 that the axis 140 of the rod journal portion 73 is substantially aligned on the pivotal axis of pin 132 to provide maximum mechanical advantage while preventing slippage between the tab 113 and the hooked-end portion 76 of the rod 72. Further, maintaining the coaxial alignment of rod journal portion 73 and pawl element pin 132 insures that the edge 142 of rod hooked-end 76 will be correctly positioned to engage the tab 133 and trigger the latch assembly. The axis of rod journal portion 73 is similarly substantially aligned on the pivotal axis of its associated pawl rivet or pin 132 of latch casing 89.

As seen in FIGS. 6 and 7 the hooked-end portion 76 of rod 72 is pivoted in a vertical plane which substantially coincides with the vertical plane defined by the principal axis of biasing spring 120 as it is moved between its latched and unlatched modes. This arrangement provides a compact latching mechanism wherein the hooked-end portions 74 and 76 are not positively connected to their respective casings 86 and 89 while permitting easy actuation by the central handle arrangement 20. It will be noted that the principal axis of the spring is oriented substantially co-planar with the surface of the pawl element shoulder 138 in both its FIG. 4 and FIG. 5 positions to provide a maximum latched biasing force which may be readily overcome.

What is claimed is:

1. In a motor vehicle having a cargo body defining an opening, a gate hinged for pivotal movement about a horizontal longitudinally extending axis between a substantially upright position closing at least a portion of said opening and an open position, said body opening including an opposed pair of striker members, a handle and latching mechanism for retaining the gate in its closed position comprising;

a pair of mirror image latch casing, each said casing mounted in a symmetrically opposite manner on a side edge of said gate;

each said casing enclosing a latch assembly having a pawl element and ratchet element with each element mounted on a horizontally disposed pivot shaft for swinging movement into and out of latched position, each said casing base formed with a striker receiving slot;

said pawl element having shoulder means thereon adapted to engage tooth means on said ratchet element to hold said ratchet element against swinging movement from its latched to its unlatched position;

a tension spring connected between said pawl and ratchet elements biasing each said ratchet element tooth means into latched position with its associated pawl element shoulder means;

the handle pivotally mounted on said gate intermediate its side edges, and operative by rotating a pair of control rods in response to pivotal movement of said handle about a horizontal axis in one direction to pivot each said pawl element into its unlatched position and automatically pivot each said ratchet element to release its associated striker;

each said control rod including an intermediate longitudinally extending journal portion formed with an inboard laterally extending handle engaged hooked-end portion and outboard laterally extending hooked-end portion adapted to engage a tab portion projecting inboard from its associated pawl element;

means mounting each said control rod on said gate with its journal portion extending substantially parallel to said gate pivotal axis;

each said control rod inboard hooked-end portion interconnected with said handle member;

each said control rod outboard hooked-end portion oriented in spaced juxtaposed relation with its associated pawl tab portion such that upon said handle means being rotated each said rod is rotated on its journal portion axis causing its latch actuator hooked end portion to engage its associated pawl tab whereby each said pawl element is rotated to disengage its shoulder means from its associated ratchet element tooth means to automatically unlatch each ratchet element from its associated striker allowing said tailgate to be pivoted into its open position.

2. The latch mechanism according to claim 1 and further including;
each said tension spring having its principal axis oriented in substantially co-planar relation with its associated control rod outboard hooked-end portion.

3. The latch mechanism according to claim 1 and further including:
each said latch casing being cup-shaped with its open side directed inboard of the vehicle adapted to receive its associated control rod outboard hooked-end portion.

4. The latch mechanism according to claim 1 and further including:
each said pawl element operative upon being rotated in one direction through a relatively small trigger angle by its associated control rod hooked-end portion causing each said ratchet element to be automatically rotated in the opposite direction through an angle of about 90° to free the tailgate latch assemblies from their associated striker.

5. The latch mechanism according to claim 1 and further including:
each said control rod in the form of a one-piece double L-shaped rod with its opposite inboard and outboard hooked-ends having an axis substantially normal to the intermediate journal portion.

6. In a motor vehicle having a cargo body defining an opening, a gate hinged for pivotal movement about a horizontal longitudinally extending axis between a substantially upright position closing at least a portion of said opening and an open position, said body opening including an opposed pair of striker members, a handle and latching mechanism for retaining the gate in its closed position comprising:

a pair of mirror image cup-shaped latch casings, each said casing mounted in a symmetrically opposite manner on a side edge of said gate having an open side directed inboard of the vehicle;

each said casing enclosing a latch assembly having a pawl element and a ratchet element with each element mounted on a horizontally disposed pivot shaft for swinging movement into and out of latched position, said casing including a base formed with a striker receiving slot;

said pawl element having shoulder means thereon adapted to engage tooth means on said ratchet element to hold said ratchet element against swinging movement from its latched to its unlatched position;

a tension spring connected between said pawl and ratchet elements biasing each said ratchet element tooth means into latched position with its associated pawl element shoulder means;

the handle pivotally mounted on said gate intermediate its side edges, and operative by rotating a pair of mirror image control rods in response to pivotal movement of said handle about a horizontal axis in one direction to pivot each said pawl element into its unlatched position and automatically pivot each said ratchet element to release its associated striker;

each said control rod including an intermediate longitudinally extending journal portion formed with an inboard laterally extending handle engaged hooked-end portion and an outboard laterally extending hooked-end portion adapted to engage a tab portion projecting inboard from its associated pawl element;

means mounting each said control rod on said gate with its journal portion extending substantially parallel to said gate pivotal axis;

each said control rod inboard hooked-end portion interconnected with said handle member;

each said control rod outboard hooked-end portion oriented in spaced juxtaposed relation with its associated pawl tab portion such that upon said handle means being rotated each said rod is rotated on its journal portion axis causing its latch actuator hooked-end portion to engage its associated pawl tab, whereby each said pawl element is rotated in one direction to disengage its shoulder means from its associated ratchet element tooth means to automatically rotate each said ratchet element and unlatch each ratchet element from its associated striker allowing said tailgate to be pivoted into its open position.

* * * * *